UNITED STATES PATENT OFFICE.

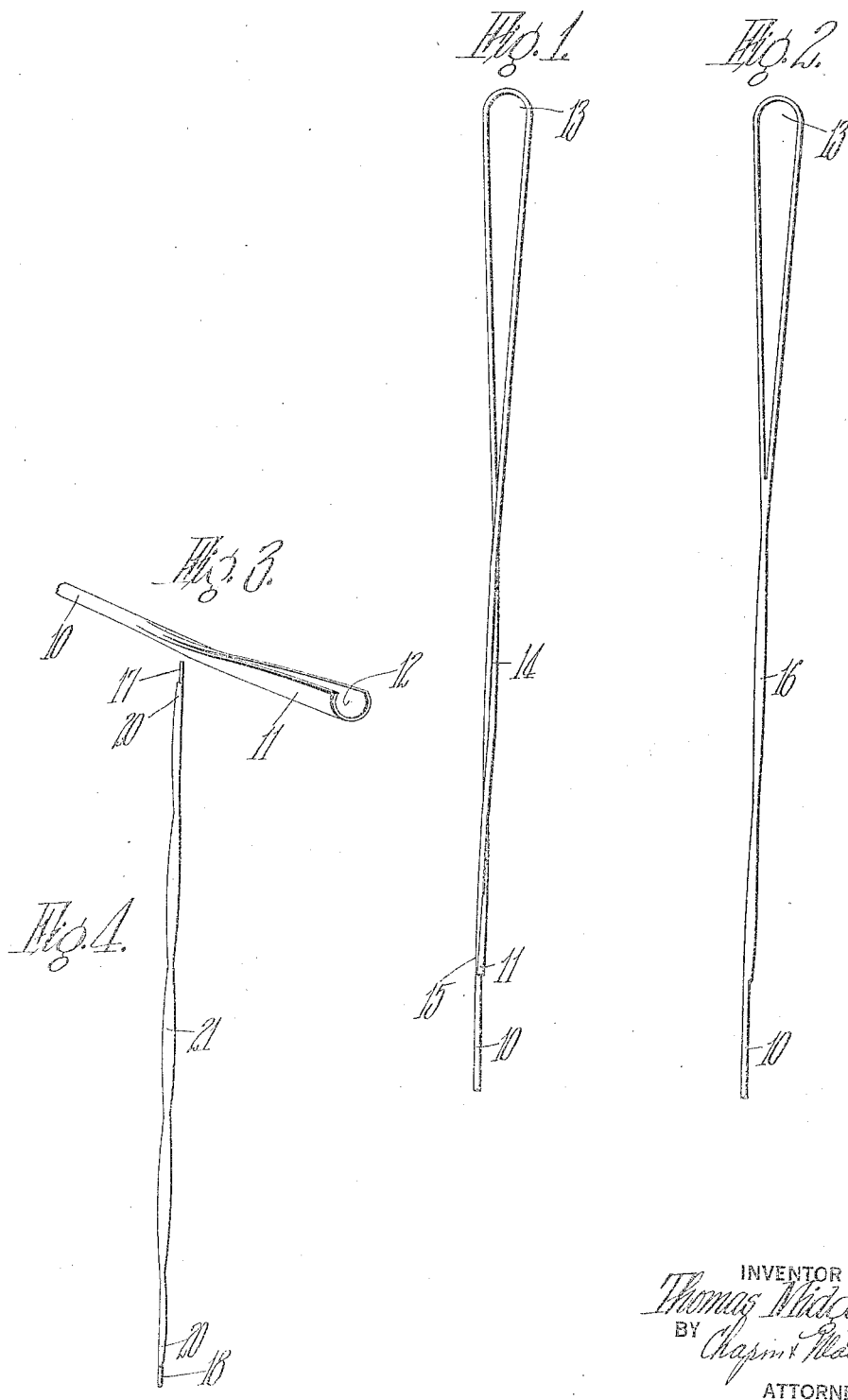

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

WIRE-SPLICE.

1,329,792.  Specification of Letters Patent.  Patented Feb. 3, 1920.

Application filed May 20, 1919. Serial No. 298,536.

*To all whom it may concern:*

Be it known that I, THOMAS MIDGLEY, a citizen of the United States of America, residing at Springfield, in the county of Hampden and State of Massachusetts, have invented certain new and useful Improvements in Wire-Splices, of which the following is a specification.

My invention relates to a wire splice, particularly to a form of splice suitable for making a loop by which the ends of the anchoring wires used in tire beads may be fastened together. It has for its object to provide a rapid method of forming a splice which will be as strong as the body of the wire itself. I preferably accomplish these results by the construction shown in the accompanying drawings in which—

Figure 1 is a view of one end of an anchoring wire used in the beads of tire casings showing the wire bent into form, previous to tinning;

Fig. 2 is a similar view after the tinning operation;

Fig. 3 is a greatly enlarged view of one end of the wire showing the method of preparing the same for the tinning; and Fig. 4 is a view showing the improved splice applied to the joining of two pieces of wire.

In forming this splice the end of the wire 10 is peened or flattened out as at 11, forming a trough-like portion 12 adapted to be fitted around the body portion of the wire in encircling relation. The wire is then bent to form a loop 13 and is twisted around itself as at 14, and the portion 11 is fitted around the body of the wire as at 15. In order to hold the parts in this position, they are fastened together preferably by dipping the wire in a bath of tin so that the twisted part of the wire will be fully soldered together as at 16. This fastening operation, however, can be done in other ways, as by welding, if desired.

If instead of forming a loop it is desired to secure the ends of two wires together, it can be done in a similar manner by twisting the body portions of the two wires about each other and peening out the end of each wire as at 12 to encircle the other wire. This form of construction is illustrated in Fig. 4, in which two wires 17 and 18 have their ends 20 peened out as described above. The two wires are twisted together, as at 21, the peened portions brought into encircling relation to the body of the other wire, and the splice fastened by means of tinning or welding as described.

I claim—

1. A wire splice having the two elements to be joined twisted about each other, the end of one of the elements formed into a trough-like portion which encircles the other element, and the twisted portion of the two elements secured together.

2. A wire splice having the body portion of the wire bent to form a loop and being twisted upon itself, the free end of the wire formed into a trough-like portion which encircles the body portion of the wire, and the twisted portions of the wire secured together.

THOMAS MIDGLEY.